Jan. 12, 1965 M. KNOBEL 3,164,981
APPARATUS FOR GAGING WIDE SHEET-FORM WORK
Filed July 5, 1963
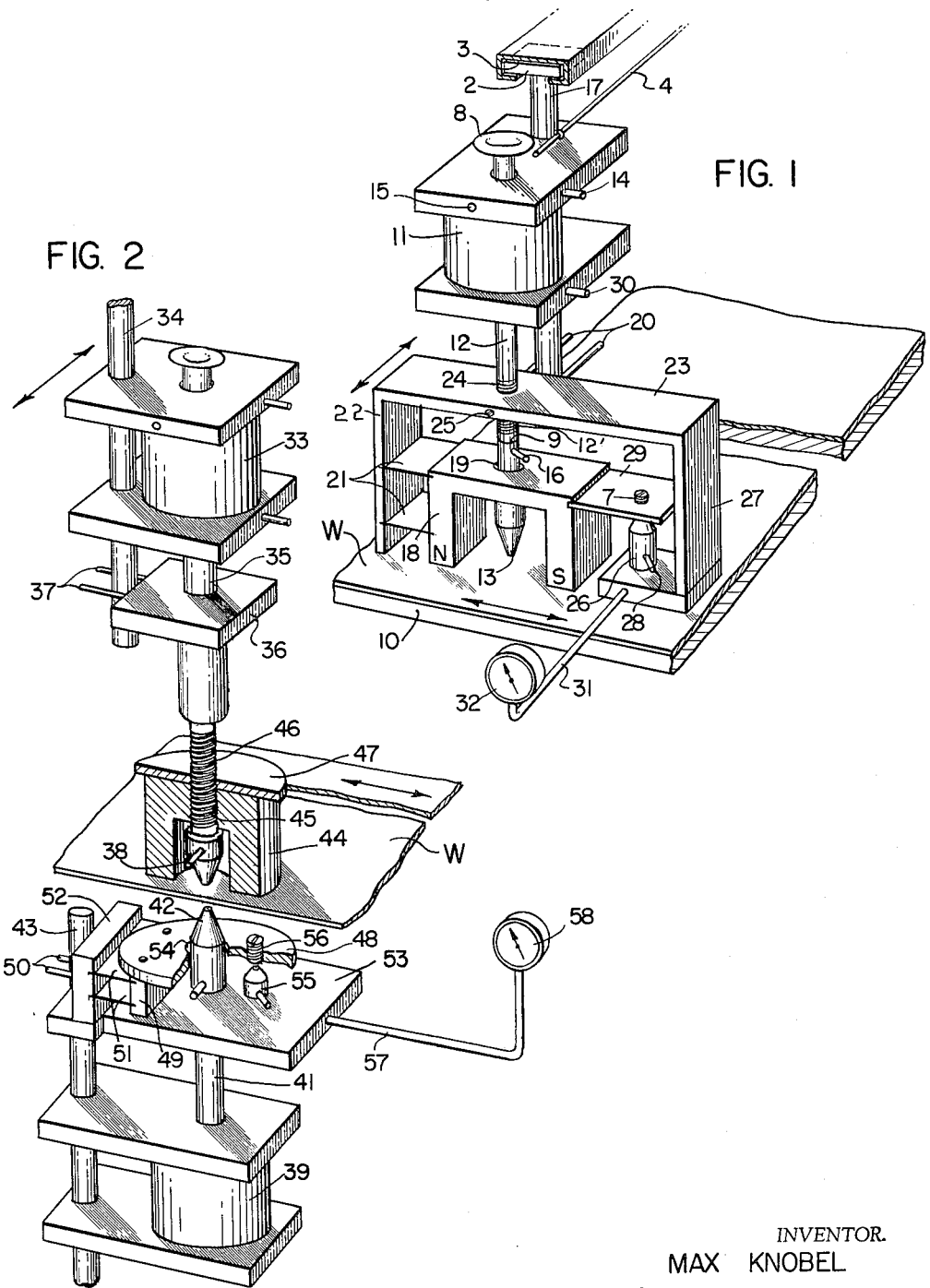
INVENTOR.
MAX KNOBEL
BY
Blair & Buckles
ATTORNEYS United States Patent Office 3,164,981
Patented Jan. 12, 1965

3,164,981
APPARATUS FOR GAGING WIDE
SHEET-FORM WORK
Max Knobel, 663 Beacon St., Boston, Mass.
Filed July 5, 1963, Ser. No. 292,864
7 Claims. (Cl. 73—37.5)

This invention relates to gage apparatus. More particularly it concerns apparatus for determining and informing as to the thickness and surface position of wide work such as sheets, plates and webs, in continuous lengths or otherwise, at any point throughout the extent thereof, with capacity for gaging across the full width of the work when so desired.

It has long been a problem to indicate the surface position or thickness of work characterized by a large width dimension, in the order of about 5 feet and upwards, particularly when such indication is needed for locations not near the work edges. The difficulty arises because it is almost impossible to etablish reference positions for the indicating apparatus with respect to the top and bottom work faces which remain true as the device reaches in from the edge of the work to gage across its full width. The reason for this is that the gaging device must be carried in its travel across the work by a rail, rod, cable or other horizontally extending track-defining support and its vertical position in space changes due to bends, bows and sags generally present in any such supporting structure. Also the horizontally extending roll, platen or other means supporting the work and determining the location in space of the bottom work face deforms between its points of support.

The result has been that conventional gaging devices do not indicate work thickness or surface position with the same accuracy at all points across the work. Errors of several thousands of an inch are not uncommon and these errors are extremely difficult to compensate for because they vary with time and irregularly across the work width. Attempts have been made to minimize the problem by utilizing relatively massive structure for supporting the gage and work. Such however have not avoided objectionable inaccuracies in practice, since sags and bends caused by vibration-produced stresses still persist and no matter how massive the structure significant variations in shape and alignment occur with changes in temperature. These and other prior devices for the purpose have also been disadvantaged in being large and bulky. Some have resorted to a large C frame whose arms hold the gaging apparatus adjacent the work faces and which moves as a whole transversely toward and away from the work. In such cases the added size and weight of the C frame has materially increased the initial cost as well as subsequent shipping and moving costs of the equipment. Further, such equipment has required a space out from one side larger than the width of the work to accommodate the set-back of the C frame as the apparatus gages the near edge portion of the work.

Accordingly this invention seeks to provide new and improved apparatus for the continuous gaging of work pieces, such as travelling sheets or webs, which are of substantial width, in the order of several feet and upwards to the maximum likely to be encountered. With my invention work thickness or position indication accuracy up to .0001 in. is possible at any point along the work.

A further object of this invention is to provide apparatus for gaging wide sheets which is relatively small, light and inexpensive yet which is rugged and extremely accurate.

This invention aims also to provide apparatus for gaging wide work pieces without contacting the work which has no massive supporting frames moving out into the floor area adjacent the work.

In certain respects the present invention further utilizes the principles of and presents features of improvement upon apparatus such as disclosed in my United States Letters Patent No. 2,982,124, and likewise with respect to dimension and position detecting, indicating and controlling as disclosed in my copending application Serial No. 278,379, filed May 6, 1963.

In the accompanyng drawing:

FIG. 1 is a perspective view of gaging apparatus embodying the principles of my invention adapted for gaging flexible work; and FIG. 2 is a perspective view of a modified form of my apparatus for gaging unsupported work.

Referring to the drawing, FIG. 1 shows my apparatus arranged to gage work W, a paper sheet for example, travelling in the indicated direction over a bearing surface or platen 10. For reasons that will become apparent hereinafter the platen 10 is constructed of a magnetically responsive material such as soft iron. The platen 10 is only slightly wider than the work and extends a relatively short distance along the length or in the direction of travel thereof. The top surface of the platen controls or determines the location in space of the bottom work face in contact therewith since the work W being flexible deforms to conform to sags or bows in the platen.

Work follower means is positioned above the top face of the work W. It may be of known conventional type such as that disclosed in my aforementioned Patent No. 2,982,124. Most preferably, however, it comprises the apparatus fully disclosed in my aforementioned copending application Serial No. 278,379, having a double acting pneumatic cylinder 11, piston and piston rod assembly indicated at 12 and an air gage nozzle 13 mounted on the lower end of the piston rod and arranged opposite the top face of work W. Compressed air from a suitable source (not shown) is supplied through an inlet 14 to the upper chamber of cylinder 11 and that air is allowed to escape from that chamber through an orifice 15 at a rate such that a static pressure is maintained in the upper chamber which biases the piston 12 and nozzle 13 downwardly toward the work. Air from the same source is supplied to the nozzle 13 through an air inlet 16 therein. The air in the nozzle exhausts against the top face of work W and the work-reflected back pressure is communicated to the lower chamber of cylinder 11 causing the piston assembly 12 and nozzle 13 to shift up or down to follow at a uniform distance the top face of the work. The work follower means is suspended by a rigid vertical post 17 mounted through the top and bottom manifolds of cylinder 11 and extending an appreciable distance below the cylinder. The top of post 17 is connected for horizontal movement along any suitable horizontal rail or wire spanning the width or length of work W. In describing the work it will be understood that the terms "width" and "length" are interchangeable. For example in FIG. 1 the post 17 is suspended from a key 2 riding in a horizontal keway 3 spanning the work. The gage apparatus is moved along the keyway by any convenient means such as an endless cable indicated at 4 and engaging over a conventional motor driven sheave (not shown). The follower means is thus able to traverse the work with the nozzle 13 remaining at a uniform distance above the top face of the work despite fluctuations in said work face or vertical deviations of the work follower means from a straight-line track across the work.

In accordance with the invention means is provided for determining work thickness which determination is independent of deformations in the work-supporting platen 10 or deviations in the track of the work follower means. The means is shown more particularly to comprise a magnet 18 resiliently suspended from nozzle 13.

The magnet 18 is arranged so that it moves with nozzle 13 as that follows the work and so that it can also move vertically with respect to the nozzle. The magnet 18 may be of the electric or permanent type and is arranged with at least one pole located adjacent the bottom of nozzle 13.

In the FIG. 1 embodiment of my invention magnet 18 is a U-shaped permanent magnet having a vertical through passage 19 for loosely receiving the piston rod 12. The magnet is arranged coaxially on the rod, poles down, and is resiliently suspended in a position of equilibrium therefrom by means of parallel upper and lower spring reeds 21 connected between one leg of magnet 18 and a depending block 22 spaced opposite said magnet leg. The block 22 is in turn secured to one end of a horizontal block 23 spaced above and overhanging magnet 18. Block 23 has a threaded vertical central passage 24 for snugly receiving the correspondingly threaded shank portion 12' of piston rod 12 and its position on rod 12 is adjustably fixed by means of a set screw 25. Magnet 18 is adjusted vertically on rod 12 by simply turning the rod with respect to member 23. A knob 8 is provided at the upper end of the rod for this purpose. Rod 12 also has a swivel joint 9 just above air inlet 16 so that the inlet 16 and nozzle 13 remain stationary during said adjustment. A pair of parallel spaced apart pins 20, 20 extend out from the side of block 23 and straddle the post 17 to prevent rotation of the piston assembly relative to cylinder 11. The magnet is thus able to move up and down with respect to the nozzle 13 in opposition to the bias afforded by springs 21, and it is also carried along with the nozzle 13 when that moves up and down to follow the top face of the work W.

As mentioned previously platen 10 is constructed of soft iron or other magnetically responsive material and it attracts or pulls the poles N, S of magnet 18 downwardly in opposition to springs 21 until the magnet reaches a position of balance or equilibrium at a point above work W at a determined distance from platen 10. If the work increases in thickness the piston rod 12 and nozzle 13 shift up to follow the top face of the work carrying magnet 18 along with them. However since the magnet 18 is now further away from platen 10 the downward force of attraction is proportionately reduced causing the magnet to shift up with respect to the nozzle 13 due to the influence of springs 21.

Conversely, if the work W becomes thinner the nozzle 13 along with magnet 18 shift down toward the work. Now however the magnet is closer to platen 10 and is subjected to an increased attractive force downward with the result that the magnet 18 moves down also with respect to nozzle 13 until the upward force provided by springs 21 again equals said downward force.

As the nozzle 13 shifts up and down to follow the top face of the work W the magnet 18 shifts vertically with respect to the nozzle 13. The position of nozzle 13 is thus indicative of the location of the top face of work W, whereas the position of the magnet 18 is indicative of the distance between the nozzle 13 and platen 10 and hence also between nozzle 13 and the bottom face of work W. Accordingly, the relative movements between the nozzle 13 and the magnet 18 correspond to the relative movements between the upper and lower faces of the work W, or in other words to changes in work thickness.

Further under the invention, means is provided for indicating the aforesaid relative movement between nozzle 13 and magnet 18. The means is shown more particularly to comprise a vertically disposed air gage nozzle 26 adapted to move with piston rod 12. Nozzle 26 is mounted on one leg of a rigid L-shaped bracket 27 whose other leg is secured to the free end of horizontal block 23. The nozzle 26 is similar to nozzle 13 and receives air through an inlet 28 from the same source supplying nozzle 13. In the illustrated embodiment, nozzle 26 is arranged vertically adjacent magnet 18 and is positioned so as to exhaust against the underside of a rigid tongue extension 29 protruding from the side of magnet 18 above nozzle 26. Tongue 29 is fitted with an adjustable threaded set screw 7 opposite the orifice of nozzle 26 permitting adjustment of the distance between the orifice and tongue 29 for reasons that will become apparent. Thus any movements of the magnet 18 with respect to nozzle 13 along with nozzle 26 produce corresponding changes in back pressure at nozzle 26. These pressure changes are communicated by means of a hose 31 to a pressure gage indicated at 32 and/or to a pressure switch or other apparatus (not shown) for controlling the work. In certain applications other accurate sensing means may be used effectively to show the relative movement between nozzle 13 and magnet 18.

The instant apparatus is thus able to traverse the work and indicate thickness at any point along the width thereof. At the end of each run, if desired, the nozzle 13 and magnet 18 can be retracted from the work W simply by introducing high pressure air into the lower chamber of cylinder 11 through an air inlet indicated at 30, or the follower can be made to traverse the work in both directions continually with no retraction.

It is important to note that the magnet 18 moves relative to nozzle 13 only in response to changes in work thickness. Hence the measurement or indication at the gage 32 is unaffected by irregularities in the platen 10 or in the track of the work follower means across the work. Thus for example if the rail supporting the work follower means sags across its length, the nozzle 13 moves up accordingly to preserve the constant spacing between the nozzle and the top face of the work. The magnet 18 is carried along with nozzle 13 thereby preserving also the same spacing between the magnet and the platen 10. There is no relative movement between the nozzle and the magnet and hence no indication by the gage of a change in the thickness of the work. Similarly if the platen 10 sags at some point along its length the flexible work W will sag along with it causing the nozzle 13 and magnet 18 to move down together again preserving the same spacing between the magnet and the platen 10. Again there is no relative movement between the nozzle 13 and the magnet 18. However when the thickness of the work changes, nozzle 13 shifts up or down accordingly and the magnet 18 under the attractive influence of platen 10 moves relative to the nozzle 13 resulting in an indication on gage 32 proportional to the relative movement between the nozzle 13 and magnet 18 and also to the change in work thickness.

FIG. 2 shows a modified form of my apparatus for gaging wide unsupported sheets or webs. The FIG. 2 device employs a pair of work follower means positioned opposite one another above and below the work. The upper work follower means has the usual double acting pneumatic cylinder 33 horizontally slidably supported by means of a vertical post 34 from horizontal supporting means such as a rail (not shown) spanning the work W. The usual piston rod 35 extends through the bottom wall of cylinder 33 and has mounted thereon a block 36 containing a pair of parallel spaced-apart pins 37 extending laterally outward therefrom. Pins 37 are arranged and adapted to straddle the low portion of post 34 and thereby to prevent the piston rod 34 from rotating with respect to cylinder 33. The usual gage nozzle 38 is provided at the lower end of piston rod 35 and arranged to exhaust against the top face of the work W. The work follower means is moved along the rail by any convenient means (also not shown) with the nozzle 38 being spaced a uniform distance above the top face of the work. The lower follower means comprises a double acting pneumatic cylinder 39, piston assembly 41 and an air gage nozzle 42 arranged opposite nozzle 38, and the lower follower means is horizontally slidably supported by a vertical post 43 from a second horizontal supporting means (not shown) below and spanning the work W. The lower work follower means is moved along its rail by suitable means (not shown) with the nozzle 42 remaining at a uniform distance from the bottom face of work W and opposite upper nozzle 38. Both the upper and lower follower means have essentially the same mode of operation as the follower means of the hereinbefore described FIG. 1 embodiment.

In accordance with the invention a magnet 44 is adjustably mounted, poles down, on and for movement with one, herein the upper, work follower means. The magnet 44 is a permanent magnet with a vertical threaded passage 45 adapted to receive a correspondingly threaded shank portion 46 of piston rod 35. The magnet 44 is screwed onto rod 35 for vertical movement therewith and its position thereon is adjustably fixed by means of a lock-nut 47 also screwed onto rod 41 above the magnet. The adjustment of magnet 44 on rod 35 controls the zero setting of the apparatus as will be described more particularly hereinafter.

A magnetically responsive member 48 consisting of a soft iron material is positioned below work W directly opposite magnet 44. Member 48 is mounted on and for movement with the lower work follower means, but it is also resiliently suspended for independent vertical swinging movements with respect to nozzle 42. More particularly, member 48 has a depending portion 49 to which is secured one end each of a plurality of spring reeds 51, the other end each of which is secured to a standard 52 integral with a horizontal platform 53 mounted on piston rod 41 below nozzle 42. A pair of pins 50, 50 protrude from the side of platform 53 and straddle post 43 to prevent rotation of piston rod 41. The member 48 is provided also with a vertical through passage 54 for loosely receiving the nozzle 42 so that the member 48 is free to swing vertically relative to the nozzle without obstruction.

During operation of the apparatus, the upper nozzle 38 and magnet 44 follow the top face of the work while the lower nozzle 42 follows the bottom face thereof. As described previously in connection with the apparatus of FIG. 1, for work of given thickness, the magnet 44 and its responsive member 48 attract one another so that the magnet will pull the member 48 up in opposition to the spring reeds 51 until the member 48 reaches a position of balance or equilibrium at a determined distance from magnet 44. The position of the member 48 with respect to lower nozzle 42 depends upon the spacing between magnet 44 and member 48 which depends in turn upon the thickness of the work W. Accordingly as the thickness of the work changes, the member 48 moves vertically relative to nozzle 42 a distance proportional to the thickness change. This relative movement may be detected and indicated by means such as a conventional air gage nozzle 55 mounted on plate 53 directly below the free end of member 48 and positioned so as to exhaust against the underside thereof. Provision is made also for adjusting the sensitivity of the air gage nozzle 55 by changing the distance between the nozzle orifice and the underside of the member 48. For this, the member 48 is fitted with an adjustable threaded set screw 56 located directly opposite the discharge orifice of the nozzle. The back pressure at the nozzle 55 is communicated by hose 57 to a simple pressure gage indicated at 58 and/or to conventional apparatus for controlling the position of thickness of the work.

It will be appreciated from the foregoing that only changes in work thicknesses cause relative movement between member 48 and lower nozzle 42 and hence indication at gage 58. The horizontal rails or wires supporting the upper and lower work follower means are free to bend or sag with no effect on the positional relationships between the upper and lower nozzles and the work. With the apparatus of FIG. 2 thickness measurements accurate to .0001 in. are possible although the rails supporting the work follower means should sag or bow ½ in. or even more because such irregularities do not affect the indication. Only actual changes in work thickness or surface position (such as a ripple) are indicated at gage 58. In an actual example a strong magnet of about 1¼ in. d. x 1½ in. long tracking about ¼ in. above the work W acting on a soft iron plate member 1½ in. d. x ⅛ in. long resiliently suspended from a sensitive air gage nozzle located below the work resulted in a full scale reading on the back pressure gage of .004 in. so that work thickness variations of as little as .0001 in. were readily detected.

Also in connection with the FIG. 2 apparatus obviously the same results are obtained if the magnet 44 is resiliently suspended from the upper work follower means and the plate member 48 is fixedly mounted from the lower follower means. The relative movement between the two will still reflect only actual changes in the thickness or surface position of the work W.

It is a feature of this invention that the sensitivities of the apparatus of FIGS. 1 and 2 can be accurately and smoothly varied by adjusting the spacing between the magnets and their respective responsive members. Referring to the apparatus of FIG. 2, for example, as the spacing between magnet 44 and member 48 becomes smaller, the distance through which the member 48 moves in response to work thickness changes represents a larger percentage of the total spacing between the magnet and member 48. Hence the sensitivity of the apparatus is increased. To increase the sensitivity of the FIG. 2 apparatus, then, the lock-nut 47 is loosened and the magnet 44 is simply screwed down on its piston rod closer to the work. Following this, the set screw 56 is screwed toward the discharge orifice of nozzle 55 for a proper zero setting on the output indicator. A further fine sensitivity adjustment is possible by varying the air pressure supplied to the air gage nozzles.

Additionally, as described in connection with the apparatus of FIG. 1, provision may be made in the FIG. 2 embodiment for retracting the upper and lower follower means at the end of each run.

The instant apparatus accurately gages work up to 1 inch or more in thickness. To change the setting to that appropriate for a given work piece, as from a relatively thin to a thicker sheet, as for example to say ¼ in. instead of ⅛ in., it is necessary only to adjust the magnet down on its piston rod ⅛ in. from where it originally stood thereby to preserve the original spacing between the magnet and its responsive member. Calibration and the zero set are easily checked by mounting a standard work piece at the end of the travel and periodically bringing the follower means down to engage it.

With the apparatus of the present invention extremely wide sheets can be gaged very accurately. Yet the structural components of the support and associated means can be light and with no special emphasis on rigidity since the parts concerned may be permitted to bow or sag without affecting the accuracy of the gage indication. Nevertheless structural members of steel or iron are tolerable so long as they are not so near the magnet as to affect its response. In actual practice small steel parts such as screws can be tolerated even near the magnet so long as they are fixed.

My invention is not limited to the particular embodiments thereof illustrated and described herein, and I set forth its scope in my following claims:

1. Apparatus for gaging wide sheet-form work comprising: follower means adapted for positioning at a determined distance from one face of such work; magnetically responsive means carried by and resiliently suspended from said follower means for independent movement relative thereto toward and away from the work; position sensing means carried by said follower means for sensing said relative movement between said magnetically responsive means and said follower means; and means located adjacent the other wide face of the work and opposite said magnetically responsive means for magnetically interacting with the latter whereby said magnetically responsive means assumes a position relative to said follower means indicative of the thickness of said work.

2. Apparatus for gaging wide sheet-form work comprising: work follower means for positioning at a constant distance from one face of such work; a magnet carried by said follower means, said magnet being also resiliently suspended from said follower means for independent movement with respect to said follower means toward and away from said work; an air gage nozzle carried by said follower means, said nozzle being arranged adjacent said magnet to sense said relative movement between said magnet and said follower means, and a magnetically responsive member located adjacent the other wide face of said work and opposite said magnet for causing said magnet to assume a determined position relative to said member, said position being indicative of the thickness of said work.

3. Apparatus for gaging wide sheet-form work comprising: means for determining the position of one wide face of such work, said means including a magnetically responsive member located adjacent said one face of said work; work follower means adapted to hold a position at a constant distance from the other wide face of said work and opposite said position determining means, said work follower means including a magnet having at least one pole located adjacent said work opposite said member, one of said magnet and said member being also resiliently suspended for independent movement relative to its corresponding said means whereby to assume a position relative thereto indicative of the thickness of said work and an air gage nozzle connected to and for movement with the corresponding said means, said nozzle being arranged and adapted to gage said position.

4. Apparatus for gaging wide sheet-form work comprising: a magnetically responsive member adapted to maintain a uniform distance relationship with respect to one wide face of said work; work follower means adapted to maintain a uniform distance relationship with respect to the other wide face of said work; means for moving said follower means across the width of said work; a magnet resiliently suspended from said follower means opposite said member, said magnet assuming a position of balance relative to said follower means indicative of the thickness of said work, and and air gage nozzle mounted on and for movement with said follower means, said nozzle exhausting against said magnet and thereby sensing the movements of said magnets relative to said follower means.

5. Apparatus for gaging wide sheet-form work comprising: work follower means adapted for positioning at a determined distance from one wide face of said work; means for moving said follower means across said work; a magnet carried by said follower means, said magnet being also resiliently suspended from said follower means for independent movement relative thereto toward and away from said sheet; position sensing means carried by said follower means for sensing said relative movement between said magnet and said follower means and a bearing member contacting the other wide face of said work, said bearing member being constructed of magnetically responsive material adapted to attract said magnet to a position of equilibrium relative to said follower means indicative of the thickness of said work.

6. Apparatus for gaging wide sheet-form work comprising: first work follower means adapted for positioning at a uniform distance from one wide face of said work; second work follower means adapted for positioning at a uniform distance from the other wide face of said work; a magnet mounted on and for movement with said first follower means; a magnetically responsive member mounted on and for movement with said second follower means, said magnet and said member being arranged and adapted to magnetically interact, said member being also resiliently suspended for independent movement relative to its corresponding follower means and means for detecting relative movements between said member and its corresponding follower means.

7. Apparatus for enabling work sheets and the like to be gaged over a substantial dimensional extent thereof comprising: first work follower means adapted for positioning at a uniform distance from one face of said work; means for causing said first work follower means to traverse said work; second work follower means adapted for positioning at a uniform distance from the other face of said work; means for causing said second work follower means to traverse said work directly below said first work follower means; a magnetically responsive member mounted on and for movement with said second follower means, said magnet and said member being arranged and adapted to magnetically interact, said member being also resiliently suspended for independent movement relative to its corresponding follower means and means for detecting relative movements between said member and its corresponding follower means.

References Cited in the file of this patent
UNITED STATES PATENTS

| 1,946,924 | Allen | Feb. 13, 1934 |

FOREIGN PATENTS

| 688,554 | Great Britain | Mar. 11, 1953 |
| 920,168 | Great Britain | Mar. 6, 1963 |